(12) United States Patent
Chang

(10) Patent No.: US 8,152,127 B2
(45) Date of Patent: Apr. 10, 2012

(54) PROTECTIVE APPARATUS FOR ELECTRONIC DEVICE

(75) Inventor: Chin-Ming Chang, Taipei Hsien (TW)

(73) Assignee: Hon Hai Precision Industry Co., Ltd, Tu-Cheng, New Taipei (TW)

( * ) Notice: Subject to any disclaimer, the term of this patent is extended or adjusted under 35 U.S.C. 154(b) by 315 days.

(21) Appl. No.: 12/649,282

(22) Filed: Dec. 29, 2009

(65) Prior Publication Data

US 2011/0095164 A1 Apr. 28, 2011

(30) Foreign Application Priority Data

Oct. 26, 2009 (CN) .......................... 2009 1 0308826

(51) Int. Cl.
*F16M 13/00* (2006.01)

(52) U.S. Cl. .................... 248/618; 361/679.34; 248/560; 248/603; 248/638; 248/346.03

(58) Field of Classification Search .................. 248/560, 248/580, 581, 603, 610, 618, 624, 638, 346.03; 361/679.34, 679.35, 679.36, 727

See application file for complete search history.

(56) References Cited

U.S. PATENT DOCUMENTS

| | | | | |
|---|---|---|---|---|
| 680,158 A | * | 8/1901 | Light | 297/282 |
| 2,474,042 A | * | 6/1949 | Egle, Jr. | 92/161 |
| 2,526,048 A | * | 10/1950 | Russell | 68/23.1 |
| 4,713,714 A | * | 12/1987 | Gatti et al. | 360/137 |
| 5,141,201 A | * | 8/1992 | Mizuno et al. | 248/550 |
| 6,477,042 B1 | * | 11/2002 | Allgeyer et al. | 361/679.34 |
| 6,498,722 B1 | * | 12/2002 | Stolz et al. | 361/679.36 |
| 7,130,187 B1 | * | 10/2006 | Sun | 361/679.34 |
| 2003/0016493 A1 | * | 1/2003 | Hiratomo et al. | 361/685 |
| 2006/0002076 A1 | * | 1/2006 | Albrecht et al. | 361/685 |
| 2011/0031372 A1 | * | 2/2011 | Shinoda et al. | 248/560 |

* cited by examiner

*Primary Examiner* — Bradley Duckworth

(74) *Attorney, Agent, or Firm* — Altis Law Group, Inc.

(57) ABSTRACT

A protective apparatus for an electronic device includes a first supporting bracket, a second supporting bracket mounted to the first supporting bracket, and a number of abutting members disposed on the second supporting bracket. The electronic device is received in the second supporting bracket and sandwiched between the plurality of abutting members. A first spring is disposed between the first supporting bracket and the second supporting bracket. A number of second springs is disposed between the first supporting bracket and the corresponding abutting members. The first resilient member and the second resilient members can absorb shocks, therefore, a shockproof protection is provided for the computer.

12 Claims, 4 Drawing Sheets

PROTECTIVE APPARATUS FOR ELECTRONIC DEVICE

BACKGROUND

1. Technical Field

The present disclosure relates to protective apparatuses and, more particularly, to a shockproof apparatus for an electronic device.

2. Description of the Related Art

To transport electronic devices, such as computers, foam or other shock-absorbing materials are often used in the packing boxes holding the electronic devices. However, for electronic devices subject to frequent relocatings, packing and unpacking the electronic devices time after time is tedious and time-consuming. Moreover, the packing material is generally fragile and has a short life span, therefore, frequent replacement of the packing material is inevitable, which brings extra cost.

DETAILED DESCRIPTION

Figure 1:
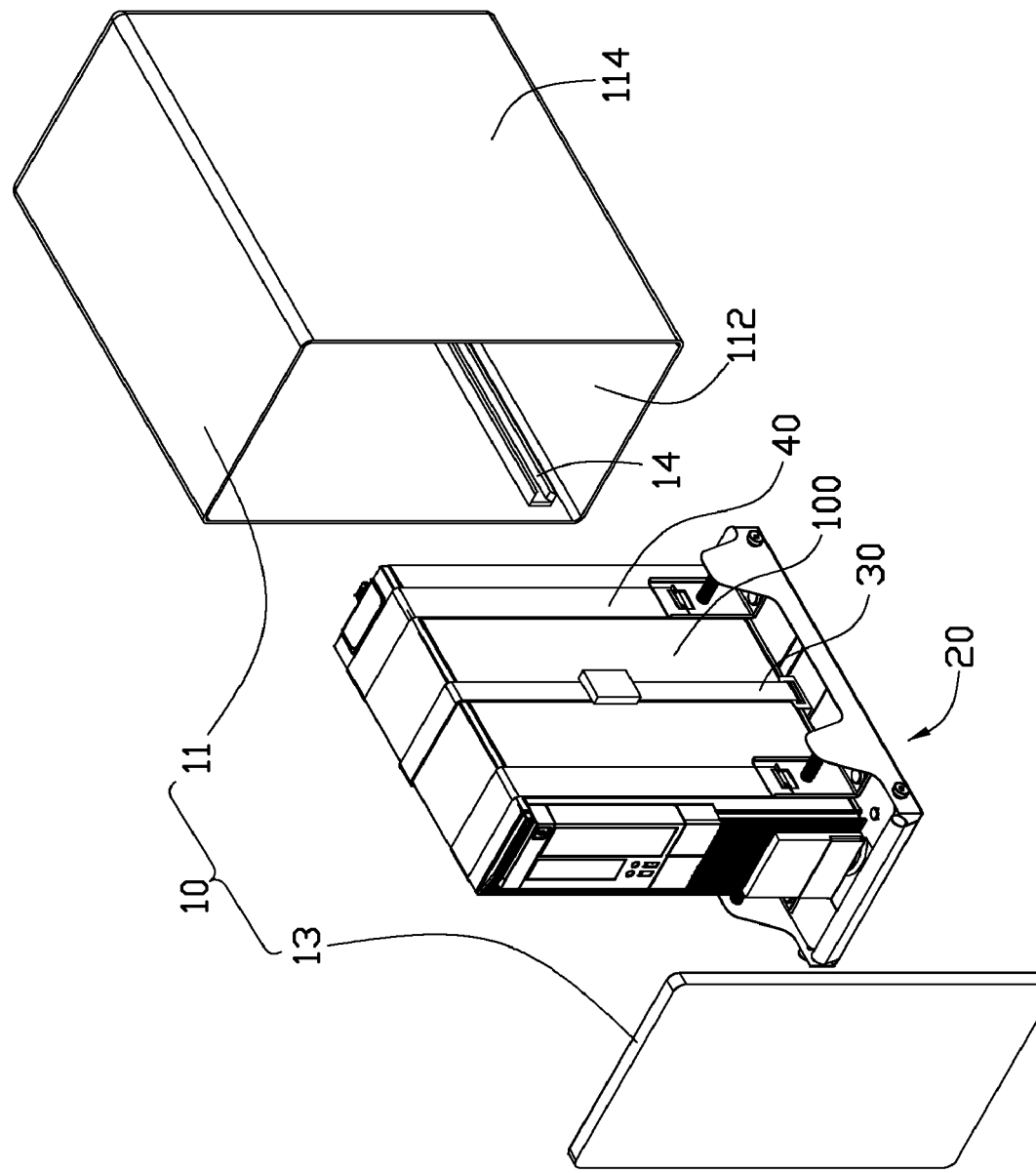
FIG. 1 is an exploded, isometric view of an embodiment of a protective apparatus and a computer, the protective apparatus including a packing box, a base, a first band, and two second bands.

Referring to FIG. 1, an embodiment of a protective apparatus is provided to protect an electronic device 100, such as a computer. The protective device includes a packing box 10, a base 20, a first band 30, and two second bands 40.

The packing box 10 includes a rectangular main body 11 defining an opening 112 for the computer 100 entering the main body 11, and a cover 13 to cover the opening 112. Two substantially U-shaped railways 14 are respectively attached to inner surfaces of opposite sidewalls 114 of the main body 11, adjacent to a bottom of the main body 11.

Figure 2:
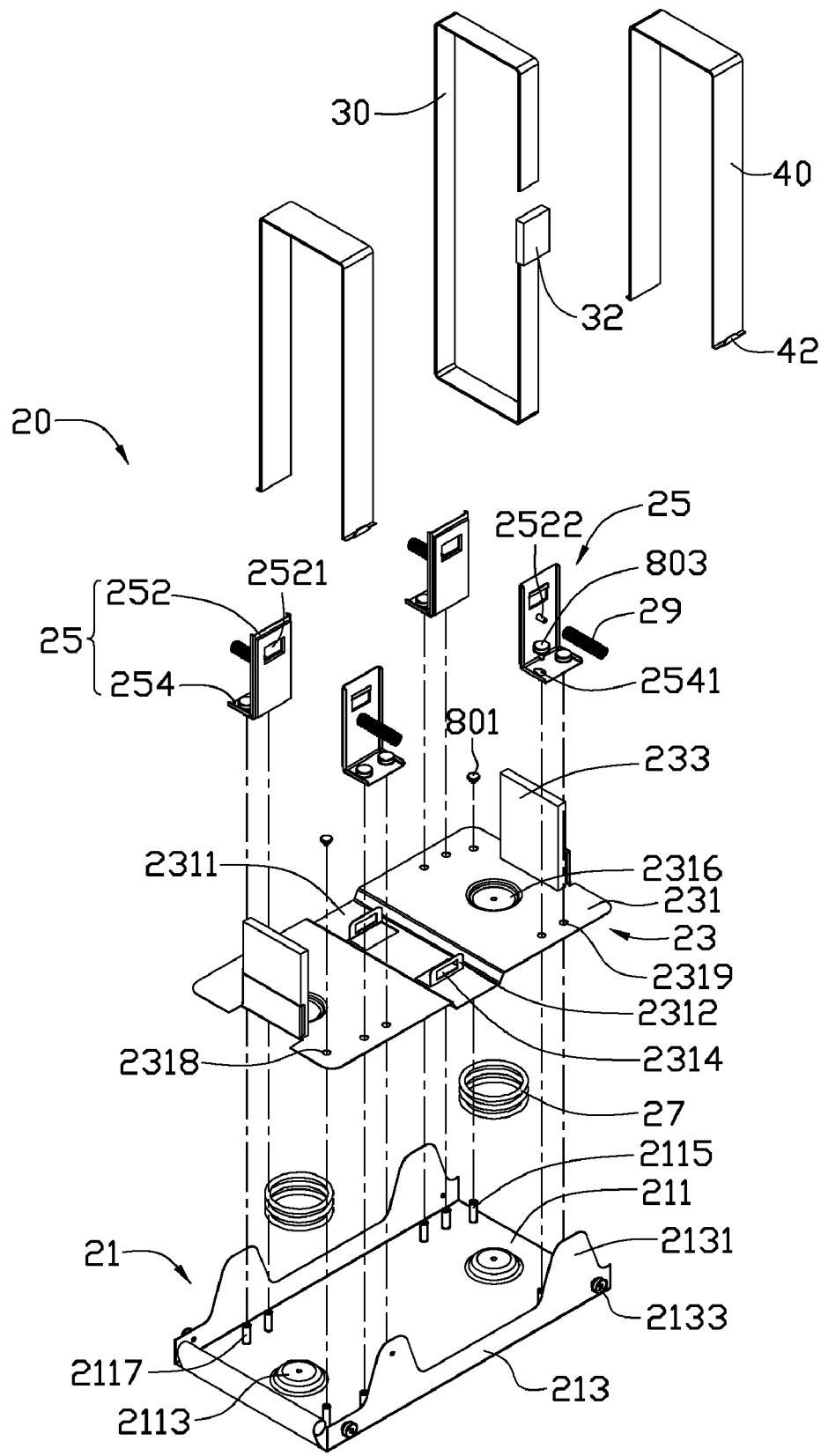
FIG. 2 is an exploded, isometric view of the base, the first band, and the second bands of FIG. 1.

Referring to FIG. 2, the base 20 includes a first supporting bracket 21, a second supporting bracket 23, four abutting members 25, two first resilient members 27, and four second resilient members 29. The first supporting bracket 21 includes a rectangular bottom plate 211, and two sidewalls 213 perpendicularly extending up from opposite sides of the bottom plate 211, respectively. Two first bulges 2113 protrude up from the bottom plate 211, adjacent to opposite ends of the bottom plate 211, respectively. Two first positioning pins 2115 extend up from the bottom plate 211, at diagonally opposite corners of the bottom plate 211. Two second positioning pins 2117 extend from each corner of the bottom plate 211. Each of the first positioning pins 2115 and the second positioning pins 2117 defines a threaded hole (not labeled) along an axis. Two protrusions 2131 extend from a top of each of the sidewalls 213, adjacent to opposite ends of the sidewall 213. Two wheels 2133 are attached to an outer surface of each of the sidewalls 213.

The second supporting bracket 23 includes a bottom plate 231 and two end walls 233 perpendicularly extending up from opposite ends of the bottom plate 231, respectively. A transverse depressed portion 2311 is defined in the bottom plate 211, with two locking tabs 2312 extending up from a bottom of the depressed portion 2311. Each of the locking tabs 2312 defines a rectangular attachment notch 2314. Two second bulges 2316 protrude down from the bottom plate 231, adjacent to the two end walls 233, respectively. Two first positioning holes 2318 are defined in the bottom plate 231, at diagonally opposite corners of the bottom plate 231, respectively. Two second positioning holes 2319 are defined in each corner of the bottom plate 231.

Each of the abutting members 25 is substantially L-shaped, and includes an abutting portion 252 and a fixing portion 254 perpendicularly extending from a bottom end of the abutting portion 252. Each abutting portion 252 members 25 defines a rectangular engagement notch 2521, adjacent to a top end of the abutting portion 252 opposite to the fixing portion 254. A mounting post 2522 perpendicularly extends from each abutting portion 252, parallel to and above the fixing portion 254. Each fixing portion 254 defines two lengthwise fixing holes 2541, with a lengthwise direction of each of the fixing holes 2541 perpendicular to the abutting portion 252.

In one embodiment, the first resilient members 27 and the second resilient members 29 are coil springs.

Opposite ends of the first band 30 can be tied up via a latch member 32.

Two hooks 42 are respectively attached to opposite ends of each of the second bands 40.

Figure 3:
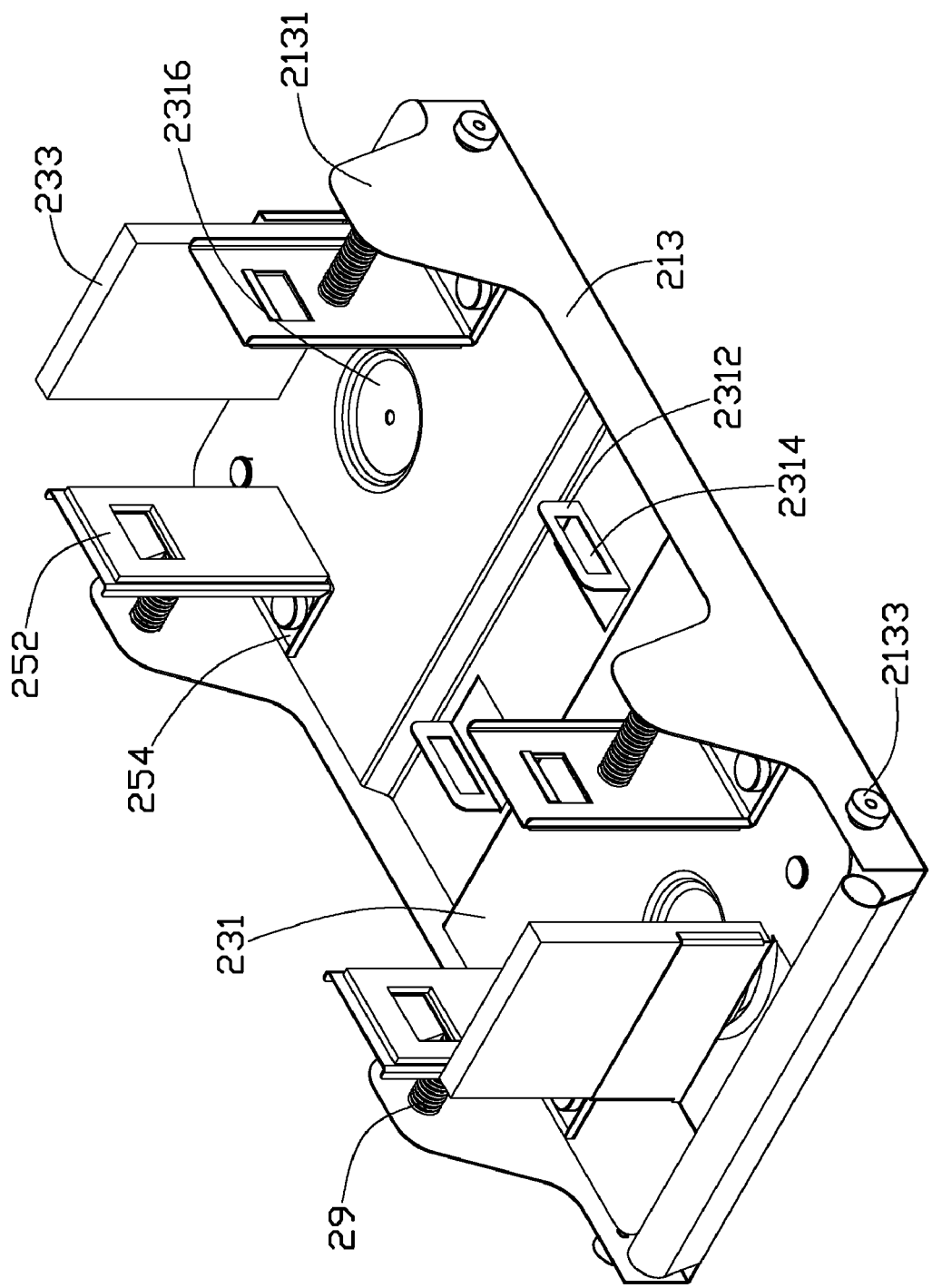
FIG. 3 is an assembled, isometric view of the base of FIG. 2.

Referring to FIGS. 2 and 3, in assembly of the base 20, the first resilient members 27 are placed around the corresponding first bulges 2113 of the first supporting bracket 21. The second supporting bracket 23 are received in the first supporting bracket 21, with the second bulges 2316 aligning with the corresponding first bulges 2113 of the first supporting bracket 21 and extending into the first resilient members 27. The first positioning pins 2115 of the first supporting bracket 21 correspondingly extend through the first positioning holes 2318 of the second supporting bracket 23, and the second positioning pins 2117 of the first supporting bracket 21 correspondingly extend through the second positioning holes 2319 of the second supporting bracket 23. Two screws 801 are respectively engaged in the threaded hole of the first positioning pins 2115, to retain the second supporting bracket 23 to the first supporting bracket 21. The first resilient members 27 are kept between the bottom plate 211 of the first supporting bracket 21 and the bottom plate 231 of the second supporting bracket 23, to absorb shock of the bottom plate 231.

Each abutting member 25 is mounted to the second supporting bracket 23, with two corresponding second positioning pins 2117 at one of the corners of the second supporting bracket 23 extending through the fixing holes 2541 of the abutting member 25. Two screws 803 are engaged in the threaded holes of the second positioning pins 2117 to secure the abutting member 25 to the bottom plate 231 of the second supporting bracket 23.

The abutting portion 252 of each of the abutting members 25 is generally perpendicular to the bottom plate 231 of the second supporting bracket 23, and the mounting posts 2522 of the abutting members 25 perpendicularly extending towards the protrusions 2131 of the sidewalls 213 of the first supporting bracket 21, respectively. The second resilient members 29 are placed around the corresponding mounting posts 2522 of the abutting members 25. Opposite ends of each of the second resilient members 29 resist against the abutting portion 252 of a corresponding one of the abutting member 25 and the corresponding protrusion 2131 of the first supporting bracket 21. Therefore, the second resilient members 29 may absorb shock to the abutting members 25.

Figure 4:
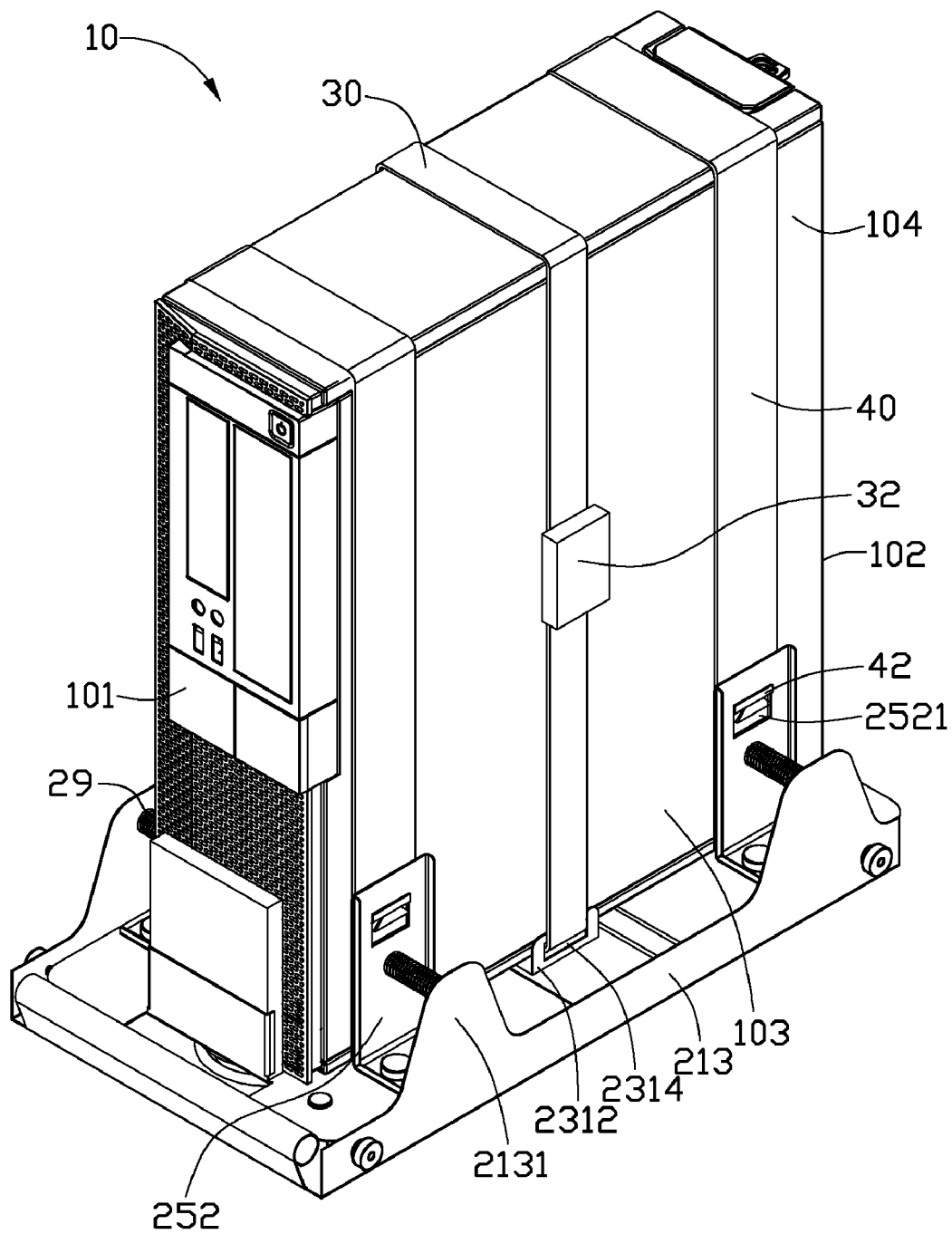
FIG. 4 is an assembled, isometric view of the base, the first band, the second bands, and the computer of FIG. 1.

Referring to FIGS. 1 and 4, in packing the computer 100, the computer 100 is placed on the bottom plate 231 of the second supporting bracket 23, with the end walls 233 of the second supporting bracket 23 respectively abutting against a front wall 101 and a rear wall 102 of the computer 100, and the abutting portions 252 abutting against opposite sidewalls 104 of the computer 100. The lengthwise fixing holes 2541 enable adjustments of distances between the abutting portions 252 of corresponding abutting members 25 to accommodate other computers with different thickness. Opposite ends of the first band 30 is tied with the latch member 32 after the first band 30 is wound around the computer 100 and extends through the attachment notches 2314 of the locking tabs 2312. Each of the second bands 40 is wound around the computer 100, and opposite ends of the second band 40 are respectively engaged in the engagement notches 2521 of two opposite abutting members 25. Therefore, the computer 100 is prevented from tilting.

The base 20 together with the computer 100 is slid into the main body 11, with the wheels 2133 of the first supporting bracket 21 slidably received in the railways 14 of the main body 11 of the packing box 10, respectively. The cover 13 is attached to the main body 11 of the packing box 10, to cover the opening 112 of the main body 11, and the computer 100 is prepared for transportation. During transportation, the first resilient members 27 and the second resilient members 29 can absorb shocks, therefore, shockproof protection is provided for the computer 100.

In some applications of moving the computer 100 for a short distance with the computer 100 kept in operation, the computer 100 can merely be received in the base 20 and transported, and the packing box 10, the first band 30, and the second bands 40 omitted.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. A protective apparatus for an electronic device, the protective apparatus comprising:
   a first supporting bracket;
   a second supporting bracket supported by the first supporting bracket, to support the electronic device;
   a plurality of abutting members mounted to the second supporting bracket, to respectively abut against two opposite walls of the electronic device;
   at least one first resilient member disposed between the first supporting bracket and the second supporting bracket, to absorb shock of the second supporting bracket; and
   a plurality of second resilient members correspondingly disposed between the abutting members and the first supporting bracket, to absorb shock of the plurality of abutting members.

2. The protective apparatus of claim 1, wherein each of the first supporting bracket and the second supporting bracket comprises a bottom plate, the at least one first resilient member comprises a coil spring, opposite ends of the coil spring resist against the bottom plates of the first supporting bracket and the second supporting bracket, respectively.

3. The protective apparatus of claim 2, wherein the at least one first resilient member comprises two coil springs; two first bulges protrude up from the bottom plate of the first supporting bracket towards the bottom plate of the second supporting bracket; two second bulges protrude down from the bottom plate of the second supporting bracket towards the bottom plate of the first supporting bracket, correspondingly aligning with the first bulges; opposite ends of each of the coil springs fitting about the corresponding first and second bulges of the bottom plates of the first and second supporting plates.

4. The protective apparatus of claim 2, wherein two positioning holes are defined in the bottom plate of the second supporting bracket, two positioning pins extend up from the bottom plate of the first supporting bracket and movably extend through the corresponding positioning holes of the first supporting bracket.

5. The protective apparatus of claim 2, wherein each of the plurality of abutting members comprises a fixing portion secured to the bottom plate of the second supporting bracket, and an abutting portion perpendicularly extending up from the fixing portion, to abut against one of the opposite walls of the electronic device.

6. The protective apparatus of claim 5, further comprising two bands to wind around the electronic device, wherein two hooks extends from opposite ends of each of the bands, the abutting portion of each of the plurality of abutting members defines an engagement notch, the hooks of the bands are correspondingly engaged in the engagement notches of the corresponding abutting members.

7. The protective apparatus of claim 5, wherein the first supporting bracket further comprises opposite sidewalls perpendicularly extending up from opposite sides of the bottom plate of the first supporting bracket, the plurality of second resilient members are a plurality of coil springs, opposite ends of each of the second resilient members resist against one of the sidewalls of the first supporting bracket and the abutting portion of a corresponding abutting member.

8. The protective apparatus of claim 7, wherein each of the plurality of abutting members further comprises a mounting post perpendicularly extending from the abutting portion of the abutting member, to extend through one of the plurality of second resilient members.

9. The protective apparatus of claim 7, wherein the fixing portion of each of the plurality of abutting members defines two fixing holes, the bottom plate of the second supporting bracket defines a plurality of positioning holes, a plurality of positioning pins extends from the bottom plate of the first supporting bracket, and extends through the corresponding positioning holes of the second supporting bracket and the corresponding fixing holes of the plurality of abutting members, a plurality of screws engages in the corresponding positioning pins of the first supporting bracket, to secure the plurality of abutting members to the bottom plate of the second supporting bracket.

10. The protective apparatus of claim 9, wherein the fixing holes of each of the plurality of abutting members are lengthwise, with a lengthwise direction of the fixing holes perpendicular to the abutting portion of the abutting member.

11. The protective apparatus of claim 2, further comprising a band wound around the electronic device and a latch member tying up opposite ends of the band, wherein two opposite locking tabs extend from the bottom plate of the second supporting bracket, each of the locking tabs defines an attachment notch, the band extends through the attachment notches of the locking tabs.

12. The protective apparatus of claim 1, further comprising a packing box receiving the base and the electronic device, wherein two railways are attached to inner surfaces of opposite sidewalls of the packing box, a plurality of wheels is attached to the first supporting bracket and slidably received in the corresponding railways of the packing box.

* * * * *